(12) United States Patent
Shi et al.

(10) Patent No.: US 11,055,835 B2
(45) Date of Patent: Jul. 6, 2021

(54) METHOD AND DEVICE FOR GENERATING VIRTUAL REALITY DATA

(71) Applicant: Ke.com (Beijing) Technology Co., Ltd., Beijing (CN)

(72) Inventors: Wenbo Shi, Beijing (CN); Xiaodong Gu, Beijing (CN); Cihui Pan, Beijing (CN); Chenglin Liu, Beijing (CN); Mingyuan Wang, Beijing (CN); Yonglin Yang, Beijing (CN)

(73) Assignee: Ke.com (Beijing) Technology, Co., Ltd., Beijing (CN)

( * ) Notice: Subject to any disclaimer, the term of this patent is extended or adjusted under 35 U.S.C. 154(b) by 0 days.

(21) Appl. No.: 17/033,129

(22) Filed: Sep. 25, 2020

(65) Prior Publication Data
US 2021/0150683 A1    May 20, 2021

(30) Foreign Application Priority Data

| Nov. 19, 2019 | (CN) | .......................... 201911133455.X |
| Mar. 25, 2020 | (CN) | .......................... 202010216380.8 |
| Mar. 25, 2020 | (CN) | .......................... 202010218038.1 |

(51) Int. Cl.
*G06T 5/50* (2006.01)
*G06N 3/04* (2006.01)
*G06T 3/40* (2006.01)

(52) U.S. Cl.
CPC ............... *G06T 5/50* (2013.01); *G06N 3/04* (2013.01); *G06T 3/4023* (2013.01); *G06T 2207/10021* (2013.01); *G06T 2207/20221* (2013.01)

(58) Field of Classification Search
None
See application file for complete search history.

(56) References Cited

U.S. PATENT DOCUMENTS

| 8,391,640 B1 | 3/2013 | Jin |
| 2018/0262683 A1* | 9/2018 | Meier ..................... H04N 5/265 |
| 2019/0035098 A1* | 1/2019 | Pinard ..................... G06T 7/593 |

(Continued)

FOREIGN PATENT DOCUMENTS

| CN | 102692806 A | 9/2012 |
| CN | 104079918 A | 10/2014 |

(Continued)

OTHER PUBLICATIONS

CN Application No. 201911133455.X, First Office Action dated Jun. 24, 2020.

(Continued)

*Primary Examiner* — James A Thompson
(74) *Attorney, Agent, or Firm* — Leydig, Voit & Mayer, Ltd.

(57) ABSTRACT

A method for generating an image of a scene with a corresponding depth map is disclosed herein. The method comprises collecting a plurality of copies of a two-dimensional image of the scene, generating an intermediate image by concatenating the plurality of copies of the two-dimensional image along a first direction, generating an intermediate depth map corresponding to the intermediate image by applying a neural network to the intermediate image, and generating, from the intermediate image and the intermediate depth map, the image of the scene with the corresponding depth map.

24 Claims, 11 Drawing Sheets

(56) References Cited

U.S. PATENT DOCUMENTS

| | | | |
|---|---|---|---|
| 2019/0294899 A1* | 9/2019 | Okubo | G06T 5/50 |
| 2020/0086791 A1* | 3/2020 | Hardy | G06T 5/005 |
| 2020/0202542 A1* | 6/2020 | Takhirov | G06T 7/50 |

FOREIGN PATENT DOCUMENTS

| | | | |
|---|---|---|---|
| CN | 104751162 A | 7/2015 |
| CN | 105611169 A | 5/2016 |
| CN | 105989573 A | 10/2016 |
| CN | 106157354 A | 11/2016 |
| CN | 106296783 A | 1/2017 |
| CN | 106815809 A | 6/2017 |
| CN | 107123136 A | 9/2017 |
| CN | 107945112 A | 4/2018 |
| CN | 108257089 A | 7/2018 |
| CN | 108416735 A | 8/2018 |
| CN | 108510573 A | 9/2018 |
| CN | 109064549 A | 12/2018 |
| CN | 109409348 A | 3/2019 |
| CN | 109472737 A | 3/2019 |
| CN | 109523617 A | 3/2019 |
| CN | 109584340 A | 4/2019 |
| CN | 109621332 A | 4/2019 |
| CN | 109685077 A | 4/2019 |
| CN | 109785376 A | 5/2019 |
| CN | 109829406 A | 5/2019 |
| CN | 110288615 A | 9/2019 |
| CN | 110333494 A | 10/2019 |
| CN | 110341597 A | 10/2019 |

OTHER PUBLICATIONS

CN Application No. 201911133455.X, Search Report dated Jun. 19, 2020.

Dolz et al., "HyperDense-Net: A hyper-densely connected CNN for multi-modal image segmentation," IEEE Transactions on Medical Imaging, vol. 32, Issue 5 (Oct. 30, 2018).

Deng et al., "Pulmonary nodule detection algorithm based on deep convolutional neural network," Journal of Computer Applications, vol. 29, Issue 7 (Jul. 10, 2019).

CN Application No. 201911133455.X, Response to Office Action filed Aug. 6, 2020.

CN Application No. 201911133455.X, Supplemental Search Report dated Sep. 7, 2020.

* cited by examiner

| | | | | | |
|---|---|---|---|---|---|
| 21 | 77 | 101 | 99 | 200 | 14 |
| 60 | 220 | 54 | 63 | 145 | 52 |
| | | | | | |
| | | | | | |
| | | | | | |
| | | | | | |
| | | | | | |
| | | | | | |
| | | | | | |
| | | | | | |
| | | | | | |
| 21 | 77 | 101 | 99 | 200 | 14 |
| 60 | 220 | 54 | 63 | 145 | 52 |

Fig. 10

METHOD AND DEVICE FOR GENERATING VIRTUAL REALITY DATA

CLAIM OF PRIORITY

This application claims the benefits of priorities to Chinese Patent Application No. 201911133455.X, filed Nov. 19, 2019, Chinese Patent Application No. 202010216380.8, filed Mar. 25, 2020, and Chinese Patent Application No. 202010218038.1, filed Mar. 25, 2020, the entire contents of which are incorporated herein by reference.

TECHNICAL FIELD

The present disclosure relates to three-dimensional modeling reconstruction and, more specifically, to determining a corresponding depth map for a two-dimensional image of a scene.

BACKGROUND

Three-dimensional (3D) model reconstruction plays an important role in the fields of industrial inspection, quality control, and machine vision. A 3D reconstruction process relies on depth information for aligning multiple images. The images may be taken at various positions and/or with different heights. Each image corresponding to a position includes a plurality of pixels, which form a set of point clouds corresponding to the position. The multiple images corresponding to multiple positions form different sets of point clouds. When combining the different sets of point clouds, depth information of each pixel of the images is used for alignment. In this way, a 3D model of the scene may be reconstructed. The reconstructed 3D model may be used for virtual reality (VR) applications.

A dedicated depth acquisition device may be used to acquire depth information. The depth acquisition device is capable of capturing distance information of the imaged object relative to the image acquisition device. Examples of the depth acquisition device may use a structured light, Time of Flight (ToF) light source, or other dedicated depth sensors. However, devices capable of capturing depth information are usually very expensive. It is economically inefficient to utilize dedicated depth acquisition devices in large-scale industrial applications. Therefore, there is a need for providing a low-cost technique for obtaining depth information.

SUMMARY

A method, computer-readable medium, and system are disclosed for generating an image of a scene with a corresponding depth map. A plurality of copies of a two-dimensional image of the scene are combined to generate an intermediate image. The intermediate image is processed by a neural network, where a suitable trained model is selected according to the input parameters associated with the intermediate image, such as a height or a latitude span. The neural network predicts a corresponding intermediate depth map and a corresponding confidence map for the intermediate image. The final image is extracted based on the intermediate image. The corresponding depth map is extracted based on the intermediate depth map and adjusted by the corresponding confidence map.

In some embodiments, a method is provided for generating a depth map corresponding to an image of a scene. The method includes collecting a plurality of copies of a two-dimensional image of the scene, generating an intermediate image by concatenating the plurality of copies of the two-dimensional image along a first direction, generating an intermediate depth map corresponding to the intermediate image by applying a neural network to the intermediate image, and generating the image of the scene with the corresponding depth map from the intermediate image and the intermediate depth map.

In some embodiments, the neural network is trained with a plurality of training data sets. Each training data set includes training images and corresponding training depth maps. The neural network is trained to predict a corresponding depth map and a corresponding confidence map for a training image. In some embodiments, the method further comprises initializing the neural network; and training the neural network with a plurality of training images with corresponding training depth maps. The method may further comprise generating, for each one of the plurality training images, a predicted depth map and a predicted confidence map based on the training image, calculating a loss function based on the depth information of the training image, the predicted depth map, and the predicted confidence map, and updating coefficients of the neural network based on the loss function.

In some embodiments, at least one training image spans 360 degrees longitudinally, and the method further comprises padding at least one of a left boundary or a right boundary of the training image.

In some embodiments, the method further comprises extracting a plurality of pixels from the image of the scene, each one of the pixels carrying a first set of attributes corresponding to a first height, generating, for each one of the pixels, a second set of attributes corresponding to a second height, and generating a second image with a second depth information based on the second set of attributes of the plurality of pixels. The first set of attributes may comprise a first longitude, a first latitude, a first depth value, and a first color value. The second set of attributes may comprise a second longitude, a second latitude, a second depth value, and a second color value. The second longitude equals to the first longitude and the second color value equals to the first color value.

In some embodiments, the method further comprises inserting additional pixels between the plurality of pixels, wherein each one of the inserted pixels includes a color value and a depth information calculated by interpolation.

In some embodiment, the intermediate image spans in a latitudinal direction less than 180 degrees. The method may further comprise determining the latitude span of the intermediate image, and generating additional pixels based on the determined latitude span.

In some embodiments, the intermediate image comprises at least one visual blind zone. The method may further comprise filling the visual blind zone with a set color, and removing an upper portion and a bottom portion of the intermediate image.

In some embodiments, the plurality of copies of the two-dimensional image include three copies.

In some embodiments, the method may comprise removing an upper portion from the intermediate image according to a first set proportion, and removing a bottom portion from the intermediate image according to a second set proportion.

According to an embodiment, a method is provided for generating depth information corresponding to an image of a scene. The method comprises generating a composite image of the scene by concatenating a plurality of copies of at least one initial image of the scene along a first direction, determining an intermediate depth map by applying a neural network to the composite image of the scene, and generating the depth information corresponding to the image of the scene based on the intermediate depth map.

In some embodiments, the method may further comprise generating the depth information corresponding to the image of the scene by obtaining a portion of the intermediate depth map corresponding to a copy of the image of the scene.

In some embodiment, the method may further comprise generating a plurality of training sets, each training set including a training image and a training depth map, and training the neural network by using the plurality of training sets. Additionally, the plurality of training sets may include a first training set and a second training set. The method further comprises generating the second training set based on the first training set.

In some embodiments, the first training set may correspond to a first height, and the second training set may correspond to a second height. The method may further comprise selecting, according to a random process, a height value for the second height from a set range, and generating the second training set further based on a mapping between the first height and the second height. In some embodiments, the image of the scene corresponds to a third height. The method further comprises obtaining a first trained model based on the first training set and a second trained model based on the second training set, and selecting, according to a first height difference between the first height and the third height and a second height difference between the second height and the third height, one of the first trained model and the second trained model for the neural network to determine the intermediate depth map. The selected one of the first trained model and the second trained model may correspond to a smaller one of the first height difference and the second height difference.

In some embodiments, the first training set corresponds to a first latitude span, the second training set corresponds to a second latitude span, and the first latitude span is greater than the second latitude span. The method may further comprise obtaining a first trained model based on the first training set and a second trained model based on the second training set, determining a third latitude span corresponding to the image of the scene, determining the third latitude span is smaller than the first latitude span and equal to or greater than the second latitude span, and selecting the second trained model for the neural network to determine the intermediate depth map.

In some embodiments, the training images and the training depth maps for a new condition is generated from existing images and depth maps for a known condition.

In an embodiment, a first training set corresponding to a first height is transformed to a second training set corresponding to a second height. A transformation relationship between the first training set and the second training set is determined. The second training set corresponding to the second height is generated based on the first training set corresponding to the first height and the transformation relationship.

In some embodiments, the neural network generates a first trained model based on the first training set corresponding to the first height and a second trained model based on the second training set corresponding to the second height. A selection of a trained model for an image corresponding to a third height is according to a height difference between the third height and the height corresponding to the trained model. The selected trained model corresponds to a smaller height difference.

Alternatively, a first training set corresponding to a first latitude span is transformed to a second training set corresponding to a second latitude span. A transformation relationship between the first training set and the second training set is determined. The second training set corresponding to the second latitude span is generated based on the first training set corresponding to the first latitude span and the transformation relationship.

In some embodiments, the neural network generates a first trained model based on the first training set corresponding to the first latitude span and a second trained model based on the second training set corresponding to the second latitude span. A trained model is selected for an image corresponding to a third latitude span. When the third latitude span is smaller than the first latitude span and equal to or greater than the second latitude span, the second trained model is selected for the image corresponding to the third latitude span.

In some embodiments, a plurality of pixels are extracted from a plurality of longitude lines of a first image. The pixels are converted from a first set of attributes to a second set of attributes. A second image is generated based on the second set of attributes of the plurality of pixels. Additional pixels are inserted between the plurality of pixels with the second set of attributes.

In some embodiments, the intermediate image is a composite image of at least one initial image of the scene. The composite image is generated by a plurality of copies of the at least one initial image along a predefined direction.

In some embodiments, the intermediate image is generated based on three copies of a two-dimensional image.

In some embodiments, the intermediate image is processed by one or more of: adding additional pixels; filling visual blind zones with a set color; removing an upper portion and/or a bottom portion of the intermediate image; padding a left boundary and/or a right boundary; or determining a maximum latitude span corresponding to the intermediate image.

In some embodiments, removing an upper portion from the intermediate image is according to a first set proportion, whereas removing a bottom portion from the intermediate image is according to a second set proportion. The first set proportion and the second set proportion may or may not be the same.

According to an embodiment, a non-transitory computer-readable medium is provided. The non-transitory computer-readable medium has computer-executable instructions stored thereon, which, when executed by one or more processor, cause a processor to facilitate generating a composite image of the scene by concatenating a plurality of copies of at least one initial image of a scene along a first direction, determining an intermediate depth map by applying a neural network to the composite image of the scene, and generating depth information corresponding to the image of the scene based on the intermediate depth map.

BRIEF DESCRIPTION OF THE DRAWINGS

FIG. 10 illustrates an embodiment of performing padding to boundaries of a panorama.

DETAILED DESCRIPTION

An image with a corresponding depth map may be generated from images taken by a camera without providing depth information directly. An intermediate image may be generated by combining a plurality of two-dimensional (2D) images without corresponding depth maps. An intermediate depth map corresponding to the intermediate image is generated by applying a neural network. A final image with a corresponding depth map is generated based on the intermediate image with the corresponding intermediate depth map.

The intermediate image may be processed by one or more of: (1) filling visual blind zones with a set color; (2) removing an upper portion and/or a bottom portion of the intermediate image; (3) padding a left boundary and/or a right boundary; and (4) determining a maximum latitude span corresponding to the intermediate image.

The neural network may be trained by a plurality of training sets to generate a plurality of trained models. A selection of a trained model for generating the intermediate depth map may be based on a height and/or a latitude span corresponding to the intermediate image. The height indicates where the camera is placed when capturing the plurality of images. The latitude span indicates the maximum latitude span of the intermediate image without visual blind zones.

A plurality of training sets may be generated from a first training set. In some embodiments, the first training set may be corresponding to a first height. A second training set corresponding to a second height may be converted from the first training set corresponding to the first height. In some embodiments, the first training set may be corresponding to a first latitude span. A second training set corresponding to a second latitude span may be converted from the first training set corresponding to the first latitude span.

The intermediate depth map generated by the neural network corresponds to the intermediate image. Therefore, each pixel of the intermediate image corresponds to a depth value and a confidence value generated by the neural network. The confidence value may be used to adjust the depth value.

A threshold of confidence value may be applied when processing (such as extracting) the intermediate image with corresponding intermediate depth map. A pixel comprises a reliable depth value if the pixel comprises a confidence value greater or equal to the threshold.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1:
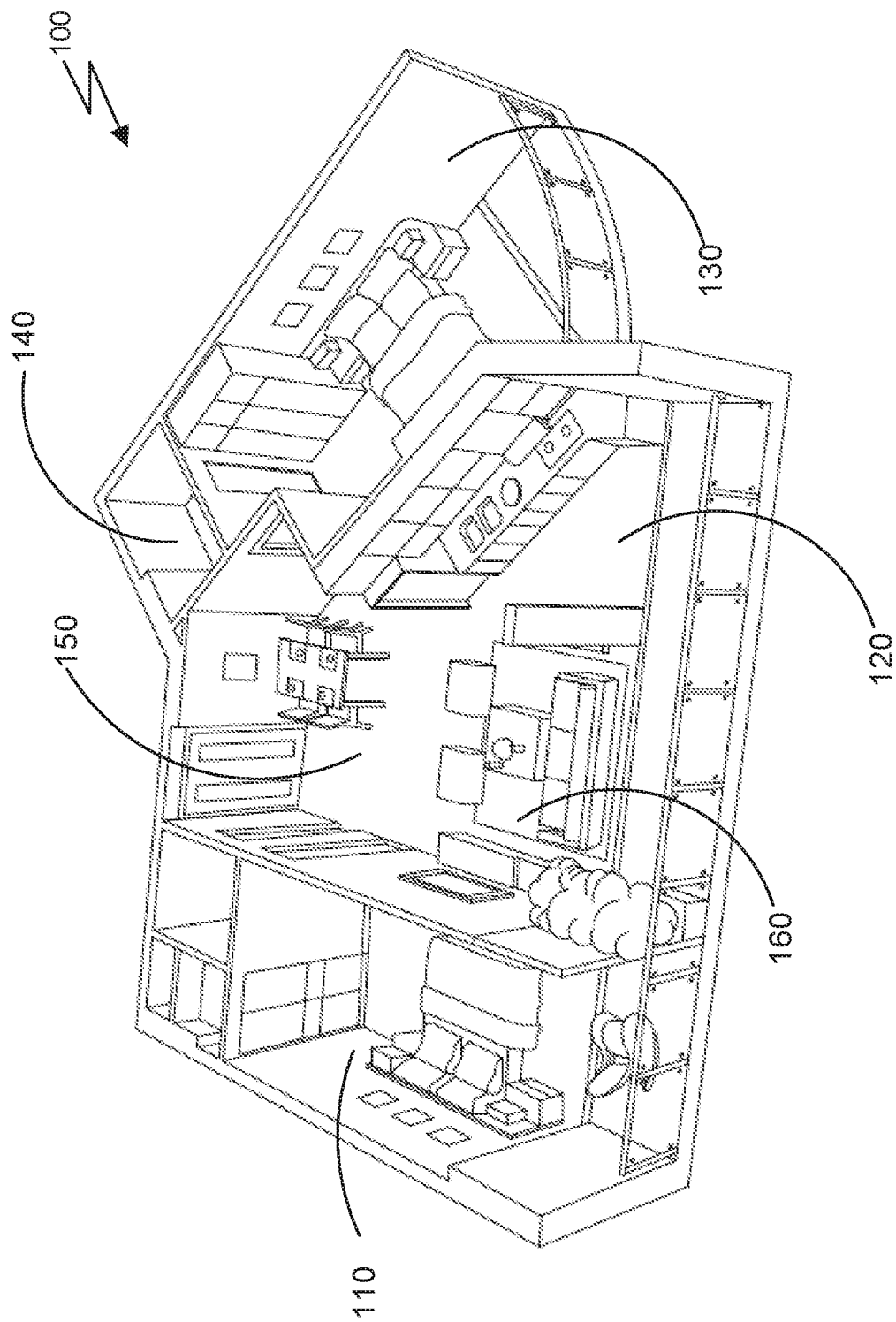
FIG. 1 illustrates an exemplary three-dimensional (3D) virtual reality (VR) environment in accordance with an embodiment.

FIG. 1 illustrates an exemplary three-dimensional (3D) virtual reality (VR) environment 100, in accordance with some embodiments. As shown in FIG. 1, the 3D VR environment 100 may simulate or represent a residential unit, such as an apartment or house floor. It is noted that the 3D VR environment 100 may include a VR representation of any in-door space or environment. Referring to FIG. 1, the 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, the functional space 110 may correspond to a first bedroom, and the functional space 130 may correspond to a second bedroom. In some cases, a functional space may correspond to an enclosed or partially enclosed space within or adjacent to a room. For example, the functional space 140 may correspond to a closet. In some cases, a functional space may correspond to an area that is generally used for a specific purpose. For example, the functional space 120 may correspond to a kitchen area, the functional space 150 may correspond to a dining area, and the functional space 160 may correspond to a living room. Although the functional spaces 120, 150, and 160 may share the same room (e.g., an enclosed area), they may be considered as different functional spaces due to their different functions.

Figure 2:
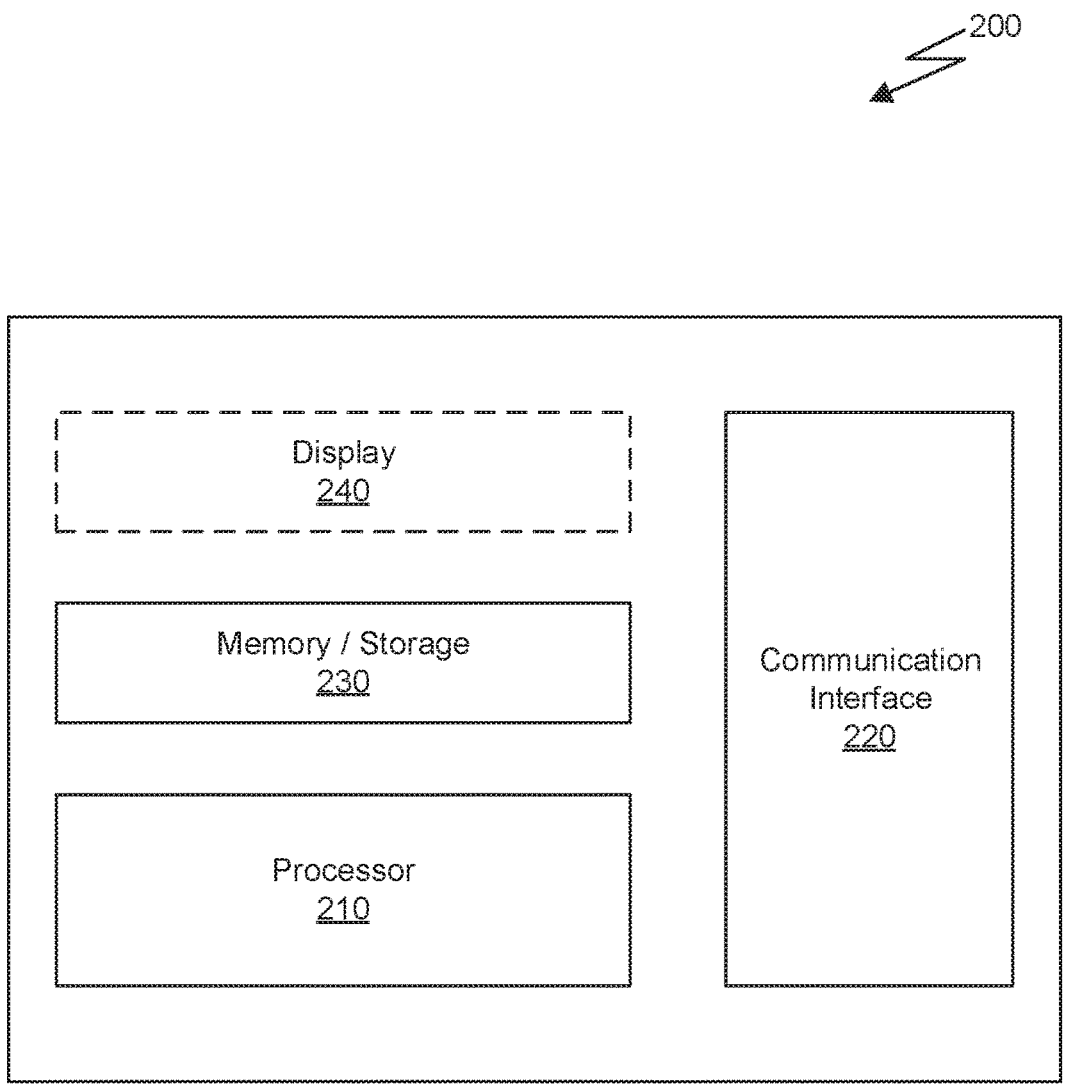
FIG. 2 illustrates a block diagram of an exemplary computer system in accordance with an embodiment.

FIG. 2 illustrates a block diagram of an exemplary computer system 200 configured to implement various functions disclosed herein. For example, the computer system 200 may be configured as a server to create or reconstruct the VR environment 100. In another example, the computer system 200 may be configured as a terminal device to display or enrich the VR environment 100. As shown in FIG. 2, the computer system 200 may include a processor 210, a communication interface 220, a memory/storage 230, and a display 240. The memory/storage 230 may be configured to store computer-readable instructions that, when executed by the processor 210, can cause the processor 210 to perform various operations disclosed herein. The memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

The processor 210 may be configured to perform the operations in accordance with the instructions stored in the memory 230. The processor 210 may include any appropriate type of general-purpose or special-purpose microprocessor, digital signal processor, microcontroller, or the like. The processor 210 may be configured as a separate processor module dedicated to performing one or more specific operations disclosed herein. Alternatively, the processor 210 may be configured as a shared processor module capable of performing other operations unrelated to the one or more specific operations disclosed herein.

The communication interface 220 may be configured to communicate information between the computer system 200 and other devices or systems. For example, the communication interface 220 may include an integrated services digital network (ISDN) card, a cable modem, a satellite modem, or a modem to provide a data communication connection. As another example, the communication interface 220 may include a local area network (LAN) card to provide a data communication connection to a compatible LAN. As a further example, the communication interface 220 may include a high-speed network adapter such as a fiber optic network adaptor, 10G Ethernet adaptor, or the like. Wireless links can also be implemented by the communication interface 220. In such an implementation, the communication interface 220 can send and receive electrical, electromagnetic, or optical signals that carry digital data streams representing various types of information via a network. The network can typically include a cellular communication network, a Wireless Local Area Network (WLAN), a Wide Area Network (WAN), or the like.

The communication interface 220 may also include various I/O devices such as a keyboard, a mouse, a touchpad, a touch screen, a microphone, a camera, a biosensor, etc. A user may input data to terminal a device through the communication interface 220.

The display 240 may be integrated as part of the computer system 200 or may be provided as a separate device communicatively coupled to the computer system 200. The display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, the display device 240 may include a VR goggle, a pair of VR glasses, or other similar devices that provide immersive VR experience. For example, the VR environment 100 may be displayed on the display 240. In some embodiments, the display 240 may be integrated as part of the communication interface 220.

Figure 3:
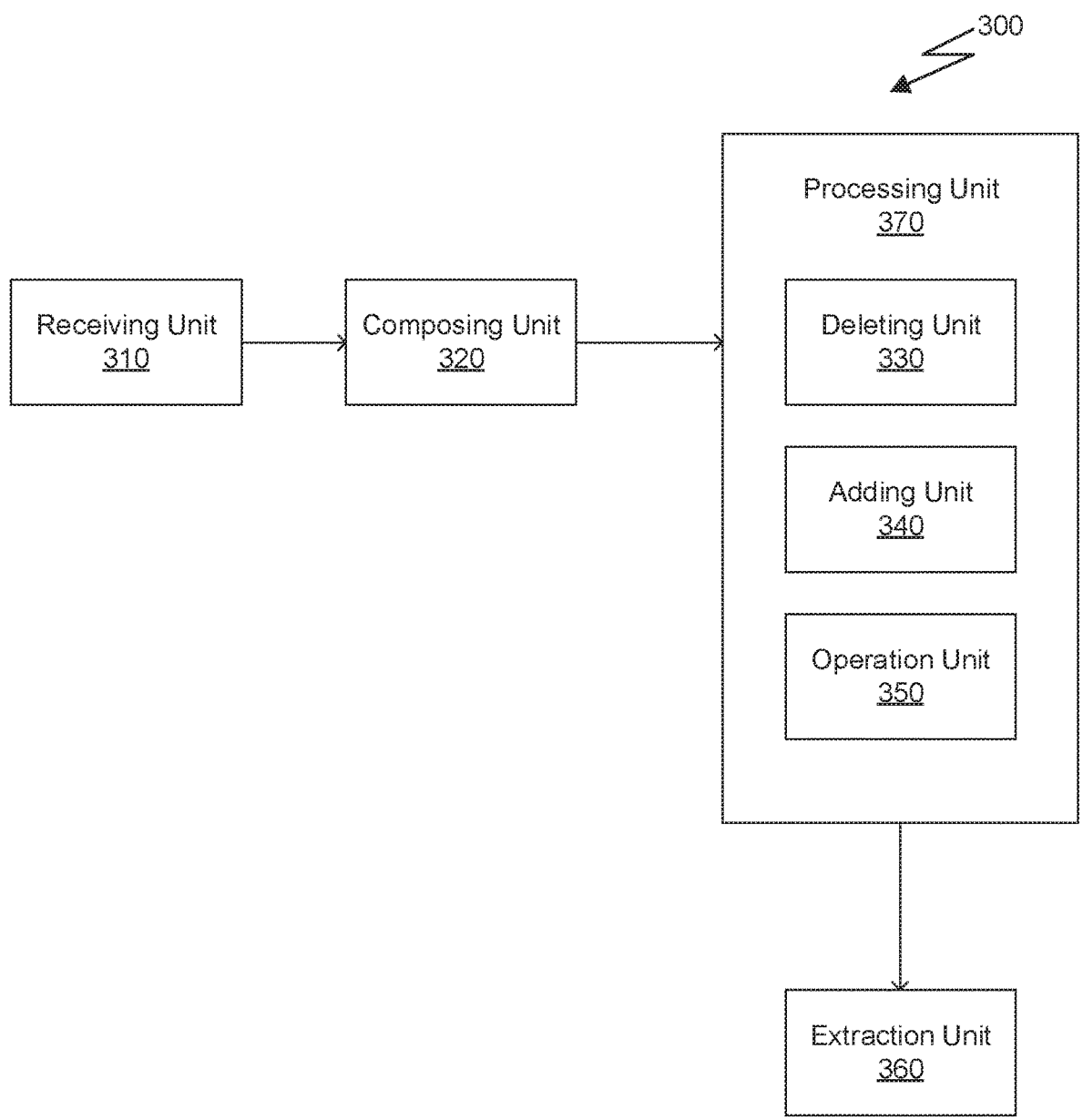
FIG. 3 illustrates an exemplary apparatus for generating an image with a depth map in accordance with an embodiment.

FIG. 3 illustrates an exemplary apparatus 300 for generating an image with a depth map in accordance with some embodiments. The apparatus 300 comprises a receiving unit 310, a composing unit 320, a processing unit 370, and an extraction unit 360, wherein the processing unit 370 comprises a deleting unit 330, an adding unit 340, and an operation unit 350.

The receiving unit 310 receives at least one 2D image of the scene. In accordance with some embodiments, the 2D image may be based on an equirectangular projection of the scene. In some embodiments, the 2D images may be a plurality of copies of at least one initial image.

The composing unit 320 generates a composite image based on the 2D images from the receiving unit 310. In an embodiment, the composing unit 320 is configured to generate the composite image based on a pre-defined number of 2D images. The 2D images may be combined based on criteria defined by users. For example, three 2D images may be concatenated from end to end along a longitudinal direction or a horizontal direction to generate the composite image. The composite image may be used as an intermediate image for generating an intermediate depth map in accordance with some embodiments.

The processing unit 370 generates a depth map based on the composite image from the composing unit 320. In an embodiment, the processing unit 370 may comprise a deleting unit 330, an adding unit 340, and an operation unit 350.

The processing unit 370 may be used to configure a pre-trained neural network and operate the neural network to generate depth information.

The extraction unit 360 may be used to generate the image with the corresponding depth map. In some embodiments, the extraction unit 360 may be used to extract a portion of the intermediate image along a pre-defined direction. For example, the extraction unit 360 may extract a portion of the intermediate image. The extracted portion of the intermediate image may have a length-to-height ratio of 2:1. In other words, the dimension of the extracted image along the longitudinal direction (or horizontal direction) may be twice of the dimension of the extracted image along the latitudinal direction (or the vertical direction). The corresponding depth map of the extracted image is determined similarly based on the depth map for the intermediate image. In an embodiment, a center portion of the intermediate image and its corresponding depth map may be extracted to form the extracted image and the corresponding depth map.

In an embodiment, the intermediate image may include a plurality of pixels, each of which has one or more color values, such as the RGB color values or the CMYK color values known in the art and determined according to the projection of the 3D scene onto the image plane of the camera. Additionally, each pixel of the intermediate image may be associated with a corresponding depth value. Each depth value indicates a distance, in the 3D space, between a feature represented by the corresponding pixel of the intermediate image and the camera. Therefore, all of the depth values corresponding to the respective pixels of the extracted image may constitute the corresponding depth map. Still additionally, each pixel of the intermediate image may be associated with a confidence value corresponding to the depth value of the respective pixel of the intermediate image. The confidence value indicates how reliably the corresponding depth value represents a true distance in the 3D space. As such, all of the confidence values corresponding to the respective depth values may constitute a confidence map corresponding to the depth map associated with the intermediate image. When performing extraction to the intermediate image, a confidence threshold may be applied to determine whether the extracted pixel comprises a confident depth (i.e., a depth value with a corresponding confidence value above the confidence threshold). Adjustment to the depth value of the pixel may be performed based on the corresponding confidence value.

In an embodiment, the processing unit 370 may configure the neural network by: (1) initializing the neural network with a trained convolutional neural network; (2) adjusting a structure of the neural network.

An exemplary configuration of a pre-trained neural network is described herein. The configuration comprises steps of:

Step 1: Initializing the Neural Network.

An initial framework of the neural network may be a pre-trained neural network of any type, such as a Convolutional Neural Network (CNN), a Recurrent Neural Network (RNN), or the like. In an embodiment, the pre-trained convolutional neural network is a pre-trained DenseNet169 model. The DenseNet is a densely connected CNN. A CNN may comprise convolutional layers, pooling layers, and Fully Connected (FC) layers. By utilizing the DenseNet, a neural network is improved with alleviated vanishing-gradient, enhanced feature propagation, improved feature exploitation, and reduced number of parameters. The pre-trained DenseNet169 model is trained on the ImageNet, with corresponding connection layers.

Step 2: Adjusting the Structure of the Neural Network.

The FC layers of the pre-trained DenseNet169 model are deleted by the deleting unit 230. Four up-sampling (i.e., up-scaling) layers are added, by the adding unit 240, following the last layer of the DenseNet169 model. Each up-sampling layer corresponds to a superimposing layer. For example, the added up-sampling layers, from the first to the last in the order of adding, may be named pool3_pool, pool2_pool, pool1 and conv1/relu. A plurality of input channels and output channels are defined on each up-sampling layer. On an up-sampling layer, the number of input channels may be defined twice as many as the number of output channels. The input information of the up-sampling layer are up-scaled to double the resolution. Subsequently, the output of the up-sampling layer is superimposed with an output from the corresponding superimposing layer. Then the superimposed results are calculated by continuously performing the convolution operation twice. The convolutional results may be linearly corrected by applying a preset activation function.

The processing unit 370 may be used to adjust a plurality of training sets prior to training the neural network. A training set comprises a training image and a corresponding training depth map. When a training image of a training set comprises at least one void, whose depth information is indefinite, the void may not be filled with a set value.

The processing unit 370 may be used to train the neural network by a supervised training method. A loss function may be calculated by the neural network, by comparing the predicted depth value and the predicted confidence value for each one of the pixels of the training image to the training depth map.

The operation unit 350 may be used to perform convolutional operations on the output from the last up-sampling layer to generate a depth map and a confidence map.

It will be appreciated that the units described in FIG. 3 may be integrated in one device, such as a terminal device or a server. Alternatively, the units may be distributed in several devices, such as a plurality of terminal devices, a plurality of servers, or a plurality of terminal devices and servers. According to an embodiment, the units described in FIG. 3 may be implemented by hardware disclosed in FIG. 2 driven by suitable software programs. For example, the receiving unit 310, the composing unit 320, the extraction unit 360, and the processing unit (including the deleting unit 330, the adding unit 340, and the operation unit 350) of FIG. 3 may be implemented by the processor 210 of FIG. 2 executing computer-executable instructions stored in the memory 230.

Figure 4:
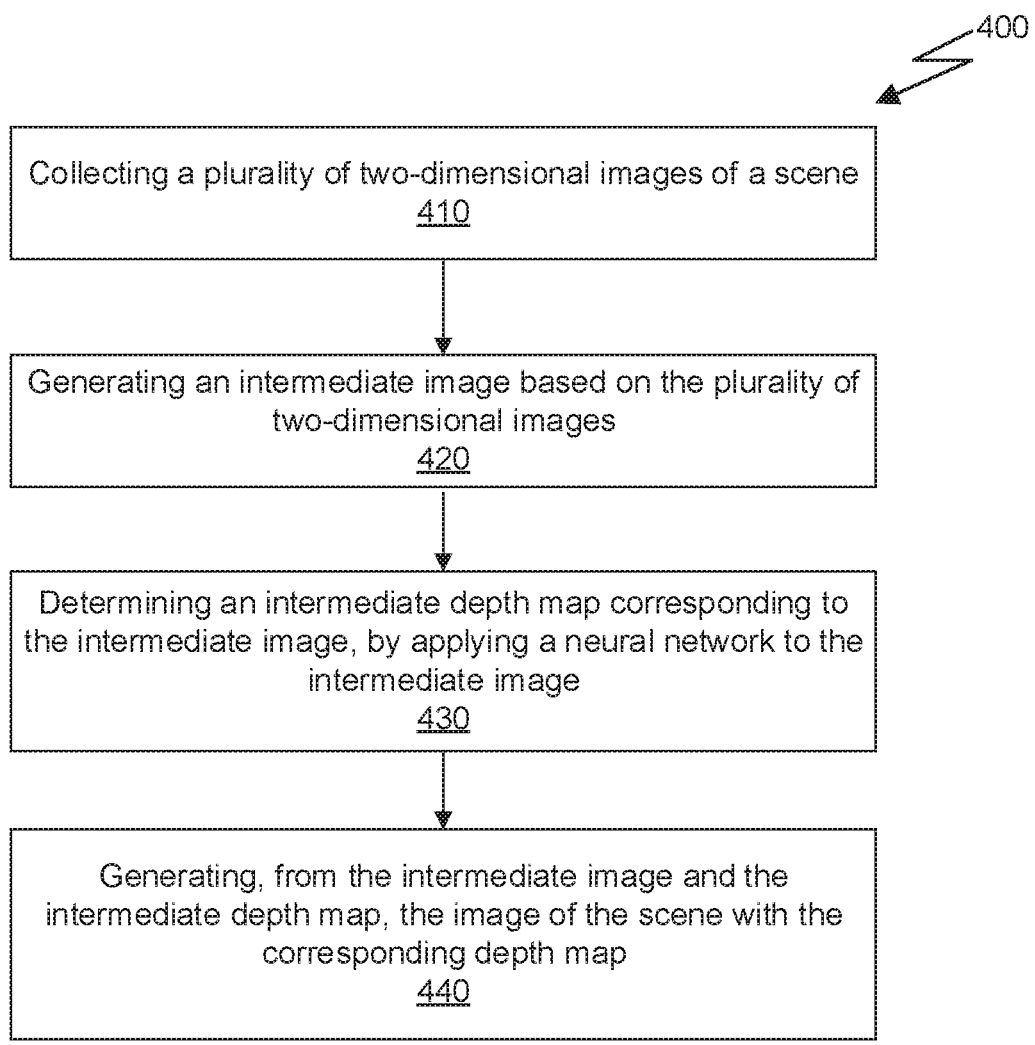
FIG. 4 illustrates a flowchart of a method for generating an image of a scene with a corresponding depth map in accordance with an embodiment.

FIG. 4 illustrates a flowchart of a method 400 for generating an image of a scene with a corresponding depth map, in accordance with some embodiments. The steps of the method 400 are described in the context of software (e.g., instructions) being executed by a processor, processing unit, or any other controller or device. However, in some embodiments, the steps can be performed by hardware or a combination of hardware and software, such as software executed by a processor that causes hardware to perform an operation (e.g., controlling a camera). Of course, it will be appreciated that any system capable of carrying out the steps of the method 400 is contemplated as being within the scope of the present disclosure.

At step 410, a plurality of 2D images of a scene are collected in accordance with some embodiments. The plurality of 2D images may be captured by an image acquisition equipment, such as a single-lens reflex (SLR) camera, a digital single-lens reflex (DSLR) camera, a mirrorless interchangeable-lens camera (MILC), a smart phone, a personal digital assistant (PDA), or other devices integrated with an image acquisition module. Each of the 2D images includes a plurality of pixels. In some embodiments, each pixel of the plurality of pixels may be a digital color image pixel, which has numerical RGB values. In some embodiments, the two-dimensional images may be black-and-white images, wherein each pixel of the images may carry a numerical value to represent a greyscale of the pixel.

According to some embodiments, 2D images of the scene may be captured by a Fisheye camera, wherein the 2D images are based on an equirectangular projection. The projection is defined on an entire sphere, which spans over 180 degrees latitudinally (or vertically) and 360 degrees longitudinally (or horizontally). An upper portion and/or a bottom portion of the images may comprise visual blind zones, due to a limited viewing angle. The images with visual blind zones may be used to generate a depth map, as long as the images preserve sufficient information of textures, lines, and objects for the neural network prediction. The visual blind zones in the image may be filled with a set color, such as black. In other words, after a 2D image based on an equirectangular projection of the scene is acquired, the presence of visual blind zones may be determined. The visual blind zones may be uniformly filled with a set color.

At step 420, an intermediate image is generated in accordance with some embodiments. The intermediate image may be a composite image of a plurality of 2D images. The 2D images may be a plurality of copies of at least one initial image of the scene. In some embodiments, the composite image is generated by concatenating the plurality of 2D images along a predefined direction. An upper portion and/or a bottom portion of the composite image may be removed, according to a preset ratio.

In accordance with some embodiments, the 2D image based on an equirectangular projection contains continuous information across left and right boundaries, when concatenating the left and right boundaries. A pre-defined number of 2D images may be concatenated along a longitudinal direction to generate the intermediate image. For example, the end of the first image is concatenated with the beginning of the second image; the end of the second image is concatenated with the beginning of the third image, and so on. The end of the last image is not concatenated with the beginning of the first image.

The ratio of a length (along the longitudinal direction) to a height (along the latitudinal direction) of the 2D image is 2:1. When a number of 2D images (i.e., N images) are concatenated along the longitudinal direction, the resulting intermediate image may have a length-to-height ratio of 2N:1. For example, when N=3, the length-to-height ratio of the intermediate image is 6:1.

The upper portion and the bottom portion of the 2D images based on an equirectangular projection may have significant distortions that may not be suitable for the subsequent neural network training and depth prediction. It may be desired to remove the upper portion and the bottom portion of the intermediate image after the concatenation. The portion to be removed may be determined according to a ratio of the original intermediate image. The height of the upper portion and the height of the bottom portion to be removed may or may not be identical. In an embodiment, for an intermediate image with a length-to-height ratio of 2:1, the height of the upper portion removed from the intermediate image may be 15% of the entire height of the intermediate image. Similarly, the height of the bottom portion removed from the intermediate image may be 15% of the entire height of the intermediate image. As a result, the length-to-height ratio of the resulting intermediate image becomes 60:7. Other ratios may be used, as long as the resulting intermediate image preserves sufficient information of textures, lines, and objects. Alternatively, the upper portion and the bottom portion to be removed from the intermediate image may be defined in terms of pixel height, meter, inch, etc.

At step 430, a depth map corresponds to the intermediate image is determined by applying a neural network to the intermediate image. The neural network may be trained to generate the depth map based on information of textures, lines, and objects contained in the intermediate image, in accordance with some embodiments. A plurality of training sets may be fed into the neural network for training, wherein each training set may include a training image and a training depth map. Training of the neural network generates a trained model for predicting a depth map corresponding to the intermediate image. In some embodiments, the training set may further include a height value indicating the height at which the image is acquired. The training set may be converted to a second training set corresponding to a second height value. A third training set may be generated by extracting a subset of the training image with corresponding depth map. By feeding the neural network with different training sets, different neural network models are generated. Selection of a trained neural network model may be determined based on input parameters of the intermediate image. The input parameters may include a height value or a latitude span of the intermediate image. Output of the neural network comprises a depth value and a confidence value for each pixel of the intermediate image. The confidence value indicates reliability of the depth value for the corresponding pixel of the depth map. In some embodiments, the confidence value may be used to adjust the depth value for the corresponding pixel.

At step 440, the image of the scene with a corresponding depth map is generated from the intermediate image with the corresponding intermediate depth map provided at step 330. In some embodiments, the image of the scene with the corresponding depth map is extracted from the intermediate image. The size of the extracted image may be defined as the same as the 2D image taken for the scene. Each pixel of the extracted image may have a corresponding depth value. In an embodiment, a confidence threshold may be applied when extracting the intermediate image. For example, the confidence threshold may be 0.8. A depth value corresponding to a confident value greater than 0.8 may be deemed as carrying a reliable depth value. The threshold may be adjusted according to different applicants. When a depth value is deemed as carrying an unreliable depth value (i.e., the corresponding confidence value being less than the confidence threshold), the depth value corresponding to the pixel may be adjusted by various methods. For example, a new depth value may be given to the pixel. The new depth value may be from a nearest pixel whose confidence value is equal to or greater than the confidence threshold. Alternatively, the new depth value may be a preset value, such as zero.

Figure 5:
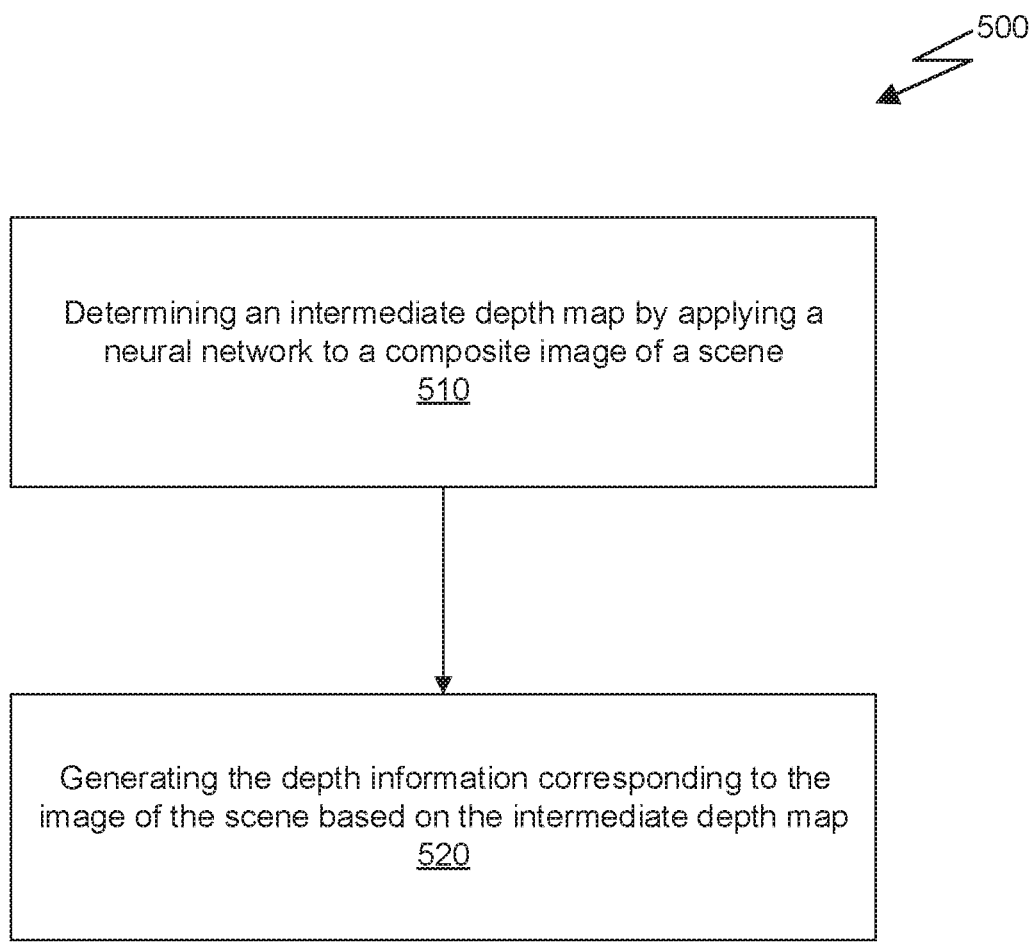
FIG. 5 illustrates a flowchart of a method for generating depth information corresponding to an image of a scene in accordance with an embodiment.

FIG. 5 illustrates a flowchart of a method 500 for generating depth information corresponding to an image of a scene, in accordance with some embodiments. The steps of the method 500 are described in the context of software (e.g., instructions) being executed by a processor, processing unit, or any other controller or device. However, in some embodiments, the steps can be performed by hardware or a combination of hardware and software, such as software executing on a processor that causes hardware to perform an operation (e.g., controlling a camera). Of course, it will be appreciated that any system capable of carrying out the steps of the method 500 is contemplated as being within the scope of the present disclosure.

At step 510, an intermediate depth map is determined by applying a neural network to a composite image of the scene. The composite image may be generated based on at least one initial image of the scene. A plurality of copies may be generated by an initial image. The plurality of copies of the at least one initial image may be combined to generate the composite image. Combining the plurality of images may be along a preset direction, such as a longitudinal direction or a horizontal direction.

The neural network is trained to determine an intermediate depth map for the composite image. In accordance with some embodiments, the neural network generates a depth map based on information of textures, lines, and objects of the composite image. The neural network may output a depth value and a confidence value for each pixel of the composite image. The confidence value may be used to determine reliability of the depth value. Additionally, the confidence value may be used to adjust the depth value.

At step 520, the depth information corresponding to the image of the scene is generated based on the intermediate depth map. Each pixel of the composite image has a corresponding depth value and a confidence value generated by the neural network. Pixels of the extracted image also have corresponding depth values, which constitute a corresponding depth map. In some embodiments, a confidence threshold may be applied to determine the reliability of the depth values in the depth map of the scene.

Figure 6:
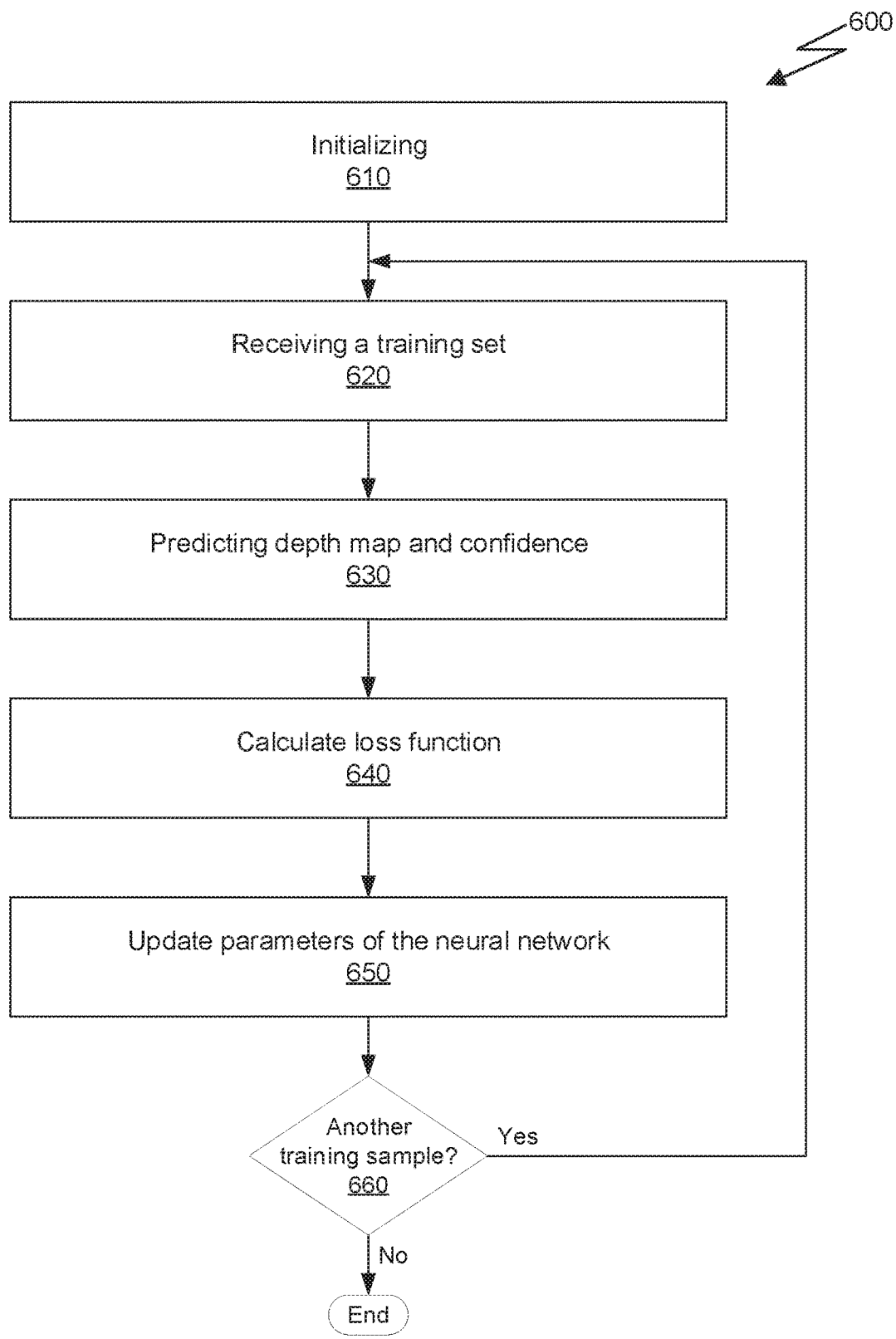
FIG. 6 illustrates a flowchart of training a neural network in accordance with an embodiment.

FIG. 6 illustrates a process 600 for training a neural network, in accordance with some embodiments. The process 600 may be implemented as a computer program having computer-executable instructions stored on a computer-readable medium of, for example, a terminal device or a server. The neural network may be trained using a training data set. The training data set includes various instances of sample input signals and corresponding target output signals. Each instance of the input signal is processed by the neural network, and the output signal is compared against the target output signal to calculate a value representing the difference based on a loss function. The value of the difference is then minimized by adjusting the parameters of the neural network (e.g., weights) in various ways, according to, for example, the gradient descent (e.g., backpropagation).

At step 610, the neural network is initialized. Initialization of the neural network including, for example, setting the initial values of various parameters of the neural network.

At step 620, a set of training data is received. The training data includes, for example, a training image and a training depth map corresponding to the training image.

At step 630, the neural network is configured to process the input training images and generate a predicted depth map with a corresponding confidence map.

At step 640, a loss function is calculated based on the predicted depth map and the training depth map. The loss function can take a variety of forms, such as an L1 loss (e.g., the least absolute deviation) or an L2 loss (e.g., the least square error).

At step 650, the parameters of the neural network are updated. In an embodiment, known techniques for updating the weights may be employed such as the backpropagation and the gradient descent.

At step 660, if the training data set includes additional training images and training depth maps, then the steps 620 through 650 described above may be repeated for the additional training images and training depth maps, until the training data is exhausted. The goal of this process is to minimize the value of the loss function over the entire training set by adjusting the parameters of the neural network.

Alternatively, at step 660, a condition for ending the training process 600 may be determined. The condition may include at least one of: a preset maximum training time period; a maximum number of training times; or a loss threshold for the loss function.

According to some embodiments, the training images and the training depth maps used by the training process 600 described above may include data captured directly from a 3D scene using a dedicated device, such as a camera with a distance sensor as known in the art. Specifically, training the neural network generally require a large amount of training data. Each trained model may be suitable for a particular known condition only, such as a specific height. When a trained model for a new condition (i.e., a new height) is needed for generating a 3D image corresponding to the new height, a different training set may be captured using the dedicated device. This process, however, can be costly.

Figure 7:
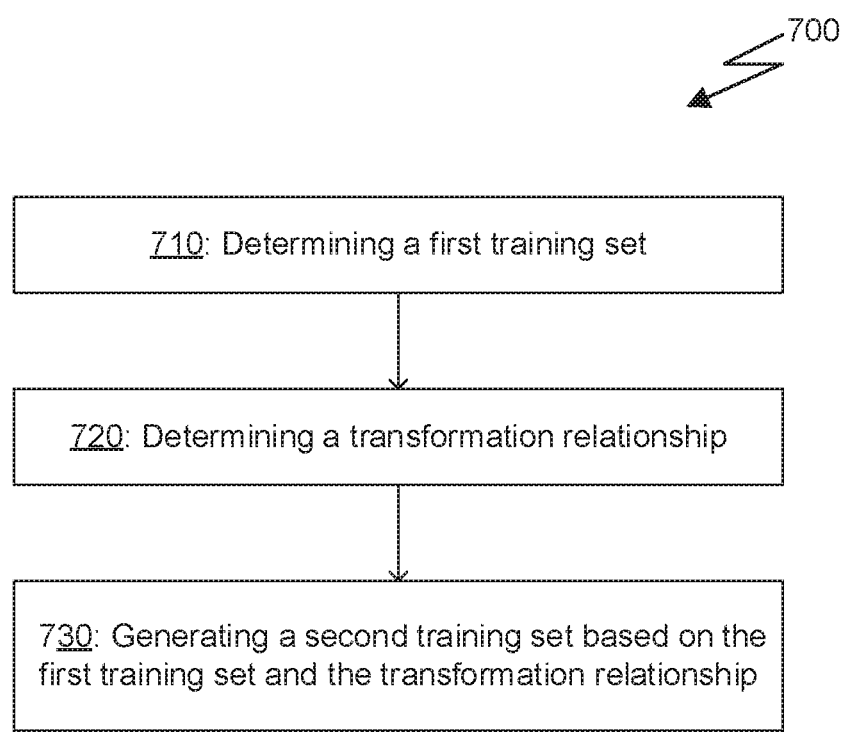
FIG. 7 illustrates a flowchart of generating a second training set from a first training set in accordance with an embodiment.

Alternatively, the training images and the training depth maps for a new condition (i.e., a new height) may be generated from existing images and depth maps for a known condition without using the dedicated device described above. FIG. 7 illustrates a process 700 for generating a second training set from a first training set according to an exemplary embodiment, thereby providing a cost-effective approach for generating training data for various conditions.

According to the process 700, at step 710, a first training set associated with a first condition (e.g., a first height) may be determined. For example, the first training set may be a set of training images and their corresponding depth maps pre-recorded by the dedicated device and stored in a data base. At step 720, a transformation relationship between the first height and the second height may be determined. The value of the second height may be obtained by a random process from a set range. The set range may be set based on user experience of taking pictures by using a camera. In an embodiment, the set range may be 0.8-1.8 meters. The transformation between the first height and the second height may be determined based on a mathematical formula derived according to a geometrical relationship as further described hereinafter. At step 730, the first training image and the corresponding first depth map of the first training set may be converted to generate a second training image and a corresponding second depth map for the second training set using the transformation relationship.

According to a further embodiment, the first training set and the second training set may be used to train the neural network according to process 600 of FIG. 6 described above. Specifically, the first training set may be fed into the neural network to generate a first trained model associated with the first height. Similarly, a second trained model associated with the second height may be generated by training the neural network using the second training set. In this way, a plurality of trained models may be generated, each corresponding to a different height.

In an embodiment, when the trained neural network is applied to an intermediate image corresponding to a third height to generate a depth map for the intermediate image as described above according to the process 400 of FIG. 4, one of the trained models, such as the first trained model or the second trained model, is selected for use in the process 400. The selection may be based on a comparison between a first height difference and a second height difference. The first height difference may be a height difference between the first height and the third height, whereas the second height difference may be a height difference between the second height and the third height. If the first height difference is smaller than the second height difference, the first trained model is selected. If the first height difference is greater than the second height difference, the second trained model is selected. It should be appreciated that there may be more than two trained models corresponding to different heights. A selection among the trained models may be made by first determining the height difference between the height corresponding to the intermediate image and each of the heights corresponding to the trained models and selecting the smallest height difference.

According to an alternative embodiment, different trained models may be needed to generate depth maps for the intermediate images having different latitude spans respectively. For example, a first trained model may be used to generate a first depth map for a first intermediate image having a latitude span of 90 degrees, whereas a second trained model may be used to generate a second depth map for a second intermediate image having a latitude span of 120 degrees. It may be costly to capture the training sets using the dedicated device for all possible latitude spans of interest. Thus, the process 700 may be applied to generate additional training sets corresponding to different latitude spans.

Specifically, a first training set may include a first image and a first depth map corresponding to a first latitude span. For example, the first latitude span may be 180 degrees. The process 700 may be executed to generate a second training set including a second image and a corresponding second depth map from the first training set. The second training set may correspond to a second latitude span. In one embodiment, the second latitude span is smaller than the first latitude span. For example, the first latitude span may be 180 degrees, whereas the second latitude span may be 120 degrees. The second latitude span for which the second training set is generated may be selected based on a random process from a set range, such as 90-180 degrees.

According to a further embodiment, different training sets corresponding to different latitude spans may be used to train the neural network to generate different trained models. Each trained model may correspond to one of the latitude spans. In this way, a plurality of trained models may be generated for different latitude spans respectively without the need for capturing images using the dedicated device.

According to a furthered embodiment, the trained models for different latitude spans obtained above may be used to generate a depth map for an intermediate image using the process 400 of FIG. 4 described above. Specifically, the plurality of trained models may be represented by $m_{i-1}$, with corresponding latitude spans of where i=1, 2, 3 . . . . For all $c_i$, $c_1=180°$, and $c_{i+1}<c_i$. A latitude span c corresponds to the intermediate image to be processed by the neural network. One of the plurality of trained models obtained above may be selected based on the following comparison: if $c=180°$, $m_0$ is selected; or if $c_i \le c < c_{i-1}$, $m_i$ is selected; or if $c<c_3$, $m_3$ is selected. Other criteria for selecting a trained model may also be used.

Figure 8A:
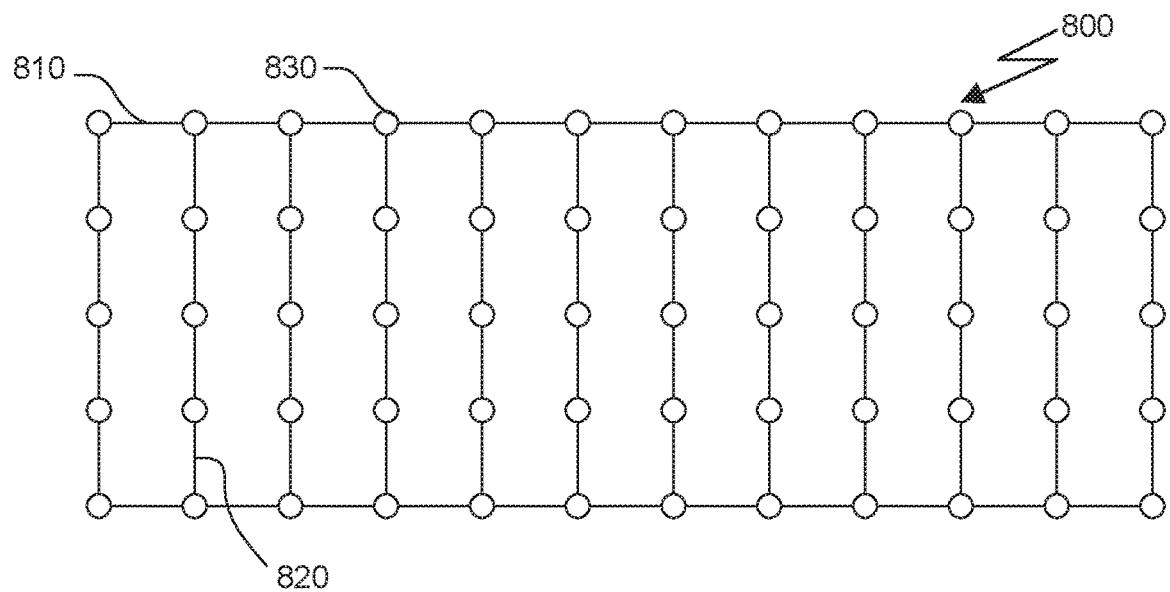
FIGS. 8A and 8B illustrate an embodiment of generating a second panorama from a first panorama.
Figure 8B:
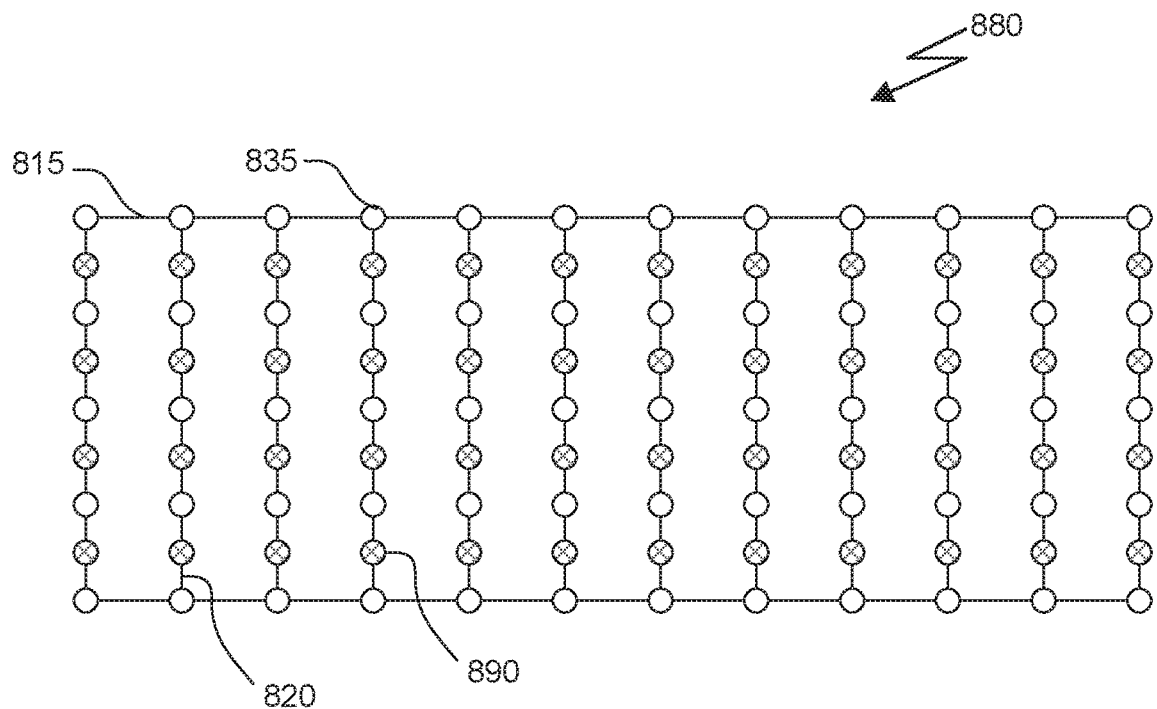

FIGS. 8A and 8B illustrate an embodiment of generating a second panorama 880 with a corresponding second depth map from a first panorama 800 with a corresponding first depth map.

The first panorama 800 corresponds to a first height. The first panorama 800 may be an image captured based on an equirectangular projection with a latitude span of 180 degrees and a longitude span of 360 degrees. The length-to-height ratio of the first panorama 800 may be 2:1. The first panorama 800 comprises a plurality of pixels, wherein each pixel may be identified by a set of latitude and longitude coordinates as shown in FIG. 8A. A plurality of longitude lines 820 may be selected from the first panorama 800. For example, a first longitude line may be selected at the 0 degree. The following longitude lines 820 may be selected with an increment of one degree between adjacent longitude lines 820. When the panorama 800 spans 360 degrees longitudinally, a total number of 360 longitude lines 820 may be selected. In some embodiments, the first panorama 800 may span less than 180 degrees latitudinally, due to a limited vertical viewing angle. For example, the panorama 800 may span equal to or less than 90 degrees latitudinally. In this case, additional pixels with set RGB values may be added to the panorama 800, such that the panorama 800 may be adjusted to a length-to-height ratio of 2:1. In one embodiment, the added pixels may comprise an RGB value of zero.

According to a further embodiment, as shown in FIG. 8A, a certain number of pixels 830 along each one of the selected longitude lines 820 may be extracted from the first panorama 800. Each pixel corresponds to a latitude line 810 in the first panorama 800. The extracted pixels 830 may be distributed uniformly or non-uniformly along each one of the longitude lines 820. The number of pixels 830 may be determined with preset criteria. Each one of the extracted pixels 830 carries a first set of attributes corresponding to the first height, wherein the first set of attributes comprise a first longitude, a first latitude, a first depth value, and a first set of RGB values. The first set of attributes corresponding to the first height may be converted to a second set of attributes corresponding to a second height. The second set of attributes comprises a second longitude, a second latitude, a second depth value, and a second set of RGB values.

In an embodiment, a change of height for capturing the images does not change the longitude coordinates of pixels. Therefore, the second longitude equals to the first longitude. The second set of RGB values may be set to be the same as the first set of RGB values. The first depth value may be converted to the second depth value, and the first latitude may be converted to the second latitude, based on a triangulation formula. As such, a first latitude line 810 in the first panorama 800 is converted to a second latitude line 815 in the second panorama 880. The conversion is illustrated in FIG. 9 in accordance with an embodiment described hereinafter.

For example, the second latitude for a pixel 835 of the second panorama 880 on a selected longitude line 820 may be one of 0.5, 1.2, 1.6 . . . , 179.5 degrees. The second set of RGB values for the pixel 835 are set to be the same as the first set of RGB values for the pixel 830. By combining all of the converted pixels 835 from the plurality of longitude lines 820, the second panorama 880 may be generated based on the first panorama 800. The corresponding second depth map may be generated by combining the converted depth values corresponding to the converted pixels 835.

In a further embodiment, at least one pixel 890 may be inserted between pixels 835 of the second panorama 880 generated based on the first panorama 800. The RGB values and the depth value of each inserted pixel 890 may be obtained by interpolation or other methods known in the art. Various types of interpolation method may be utilized, such as the nearest-neighbor interpolation, the linear interpolation, the polynomial interpolation, the spline interpolation, and the like. The selection of an interpolation method is based on actual requirements of accuracy, smoothness, number of data points, costs, and computational complexities. Adding inserted pixels 890 to the second panorama 880 and the corresponding depth map may improve resolution.

Figure 9:
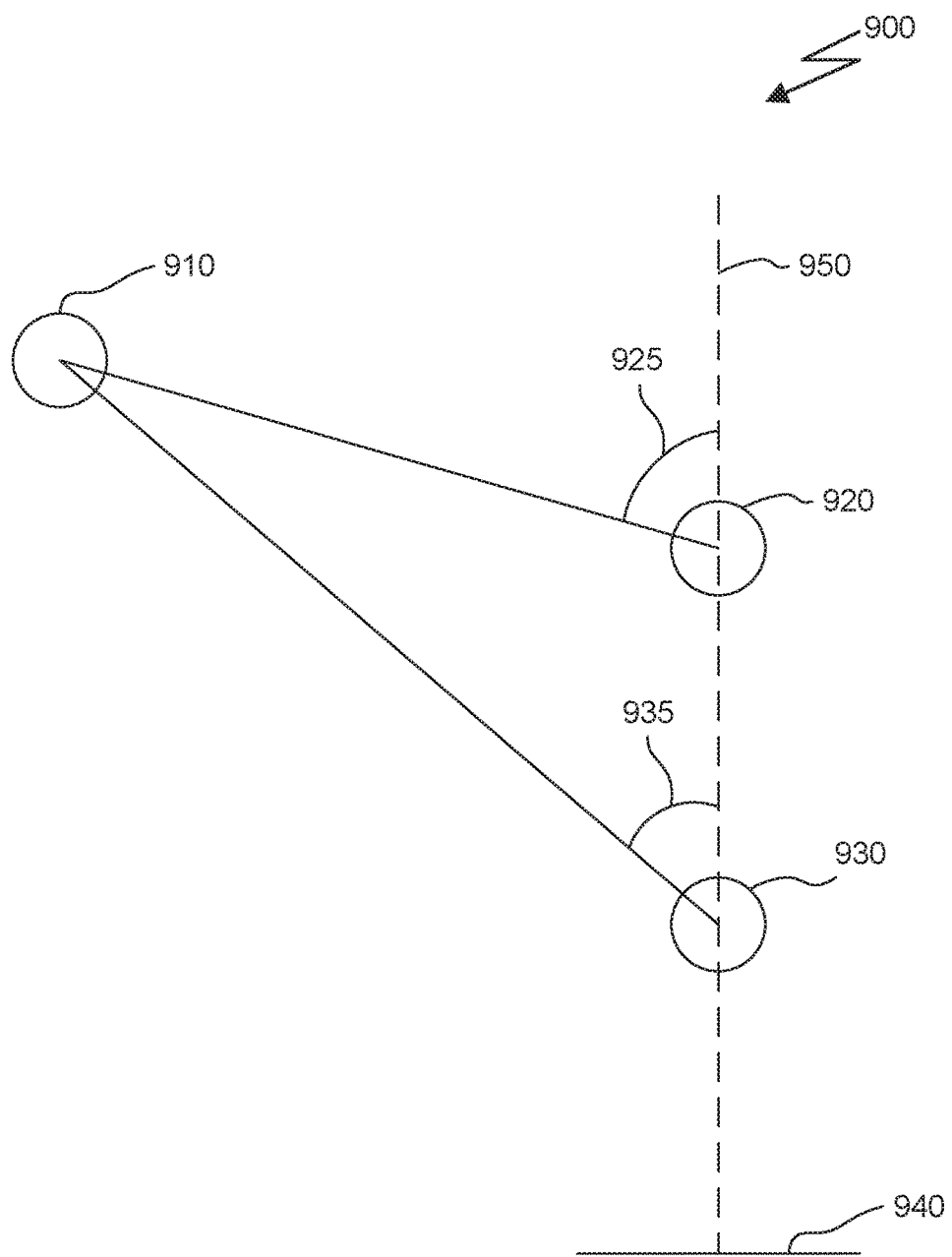
FIG. 9 illustrates an embodiment of converting a pixel of a panorama corresponding to a first height to a pixel of a panorama corresponding to a second height.

FIG. 9 illustrates a process 900 for converting a pixel of a first panorama corresponding to a first height to a pixel of a second panorama corresponding to a second height, according to an embodiment. The first height ($h_1$) is a distance between the ground level 940 and a first capturing position 920 corresponding to the first panorama. The second height ($h_2$) is a distance between the ground level 940 and a second capturing position 930 corresponding to the second panorama. Both the first capturing position 920 and the second capturing position 930 are on the same vertical reference line 950 (i.e., the same longitude line).

According to an embodiment, a 3D point 910 in the 3D scene may correspond to a first pixel in the first panorama. The first pixel may have a first set of coordinates ($u_1$, $v_1$) corresponding to the first height ($h_1$), wherein $u_1$ is a longitudinal coordinate and $v_1$ is a latitudinal coordinate 925. A first depth ($d_1$) for the first pixel is a distance between the 3D point 910 and the first capturing position 920. A second depth ($d_2$) is a distance between the 3D point 910 and the second capturing position 930. A second set of coordinates ($u_2$, $v_2$), and the second depth $d_2$ may be calculated based on the first set of coordinates ($u_1$, $v_1$), the first height ($h_1$), and the first depth ($d_1$), wherein $u_2$ is a longitudinal coordinate and $v_2$ is a latitudinal coordinate 935.

Specifically, since a change of the capturing position from the first capturing position 920 to the second capturing position 930 does not change the longitudinal coordinate, thus $u_2$ is the same as $u_1$. Further, $d_2$ may be calculated according to the triangulation formula: $d_2^2 = d_1^2 + (h_1 - h_2)^2 - 2 \times d_1 \times (h_1 - h_2) \times \cos(\pi - v_1)$ Still further, $v_2$ may be calculated according to the triangulation formula:

$$\frac{d_1}{\sin(v_2)} = \frac{d_2}{\sin(\pi - v_1)} = \frac{d_2}{\sin(v_1)},$$

when $c_1$ is above $c_2$; or $$\frac{d_1}{\sin(\pi - v_2)} = \frac{d_2}{\sin(v_1)} = \frac{d_1}{\sin(v_2)},$$

when $c_1$ is below $c_2$. Both equations may be rewritten to express a relationship of $$\sin(v_2) = d_1 \times \frac{\sin(v_1)}{d_2}.$$

Figure 10:
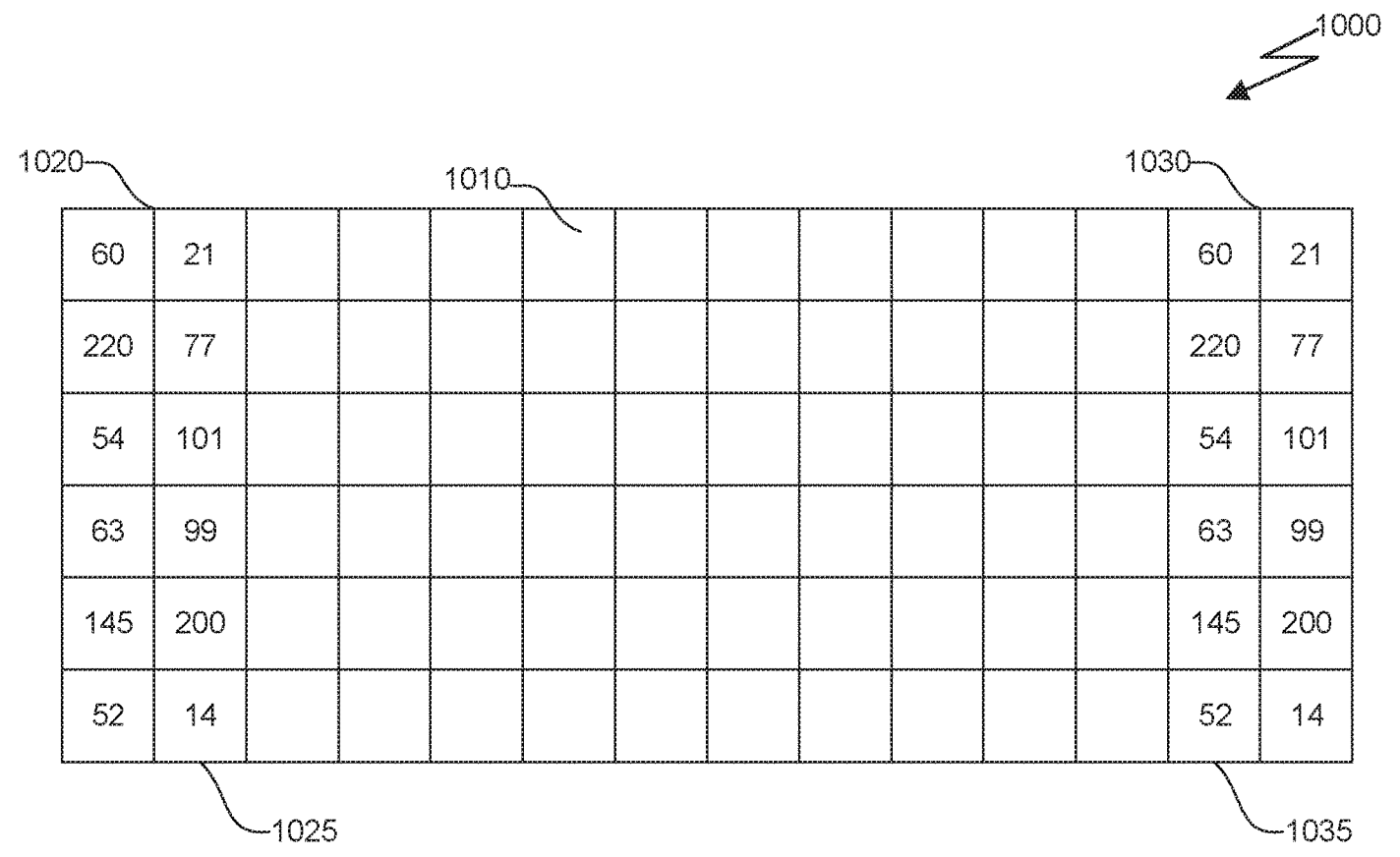

In accordance with some embodiments, training of the neural network is based on a convolutional computation. When the training set comprises a panorama, left and right boundaries of the panorama may be improved by performing padding to the boundaries, as illustrated in FIG. 10. The panorama 1000 has a longitude span of 360 degrees, which comprises a left boundary 1020 and a right boundary 1030. The panorama 1000 comprises a plurality of pixels 1010, wherein each pixel 1010 may include a set of RGB values, a depth value, or some other values. When the left boundary 1020 and the right boundary 1030 are concatenated, information across the boundaries is continuous. In an embodiment of performing padding to the boundaries, the out most column of pixels 1025 at the left boundary 1020 may be padded to the right boundary 1030. The out most column of pixels 1035 at the right boundary 1030 may be padded to the left boundary 1020. Additional columns of pixels may also be padded to at least one of the left and right boundaries, based on computational considerations. By padding additional pixels to the boundaries, accuracy of the convolutional computation at the boundaries may be improved. Therefore, accuracy of the depth map generated by the neural network based on the convolutional computation may be improved.

Figure 11A:
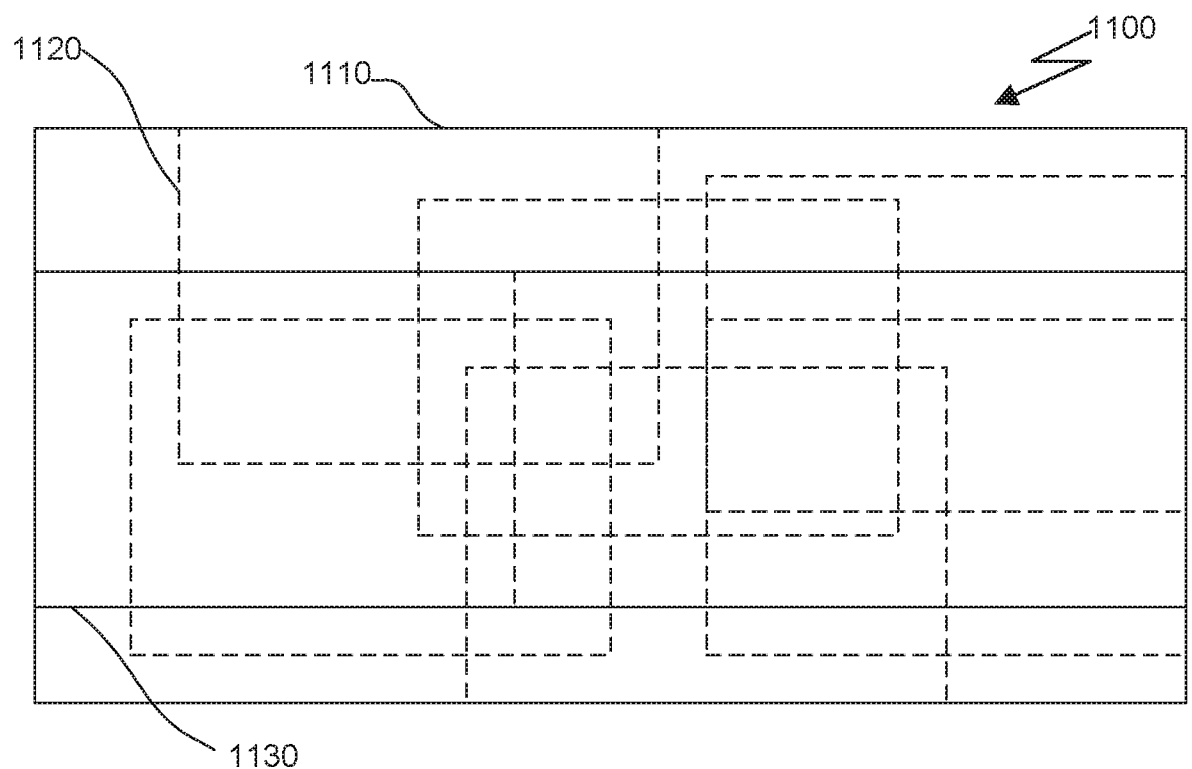
FIGS. 11A-B illustrate embodiments of generating an effective panorama of a scene.
Figure 11B:
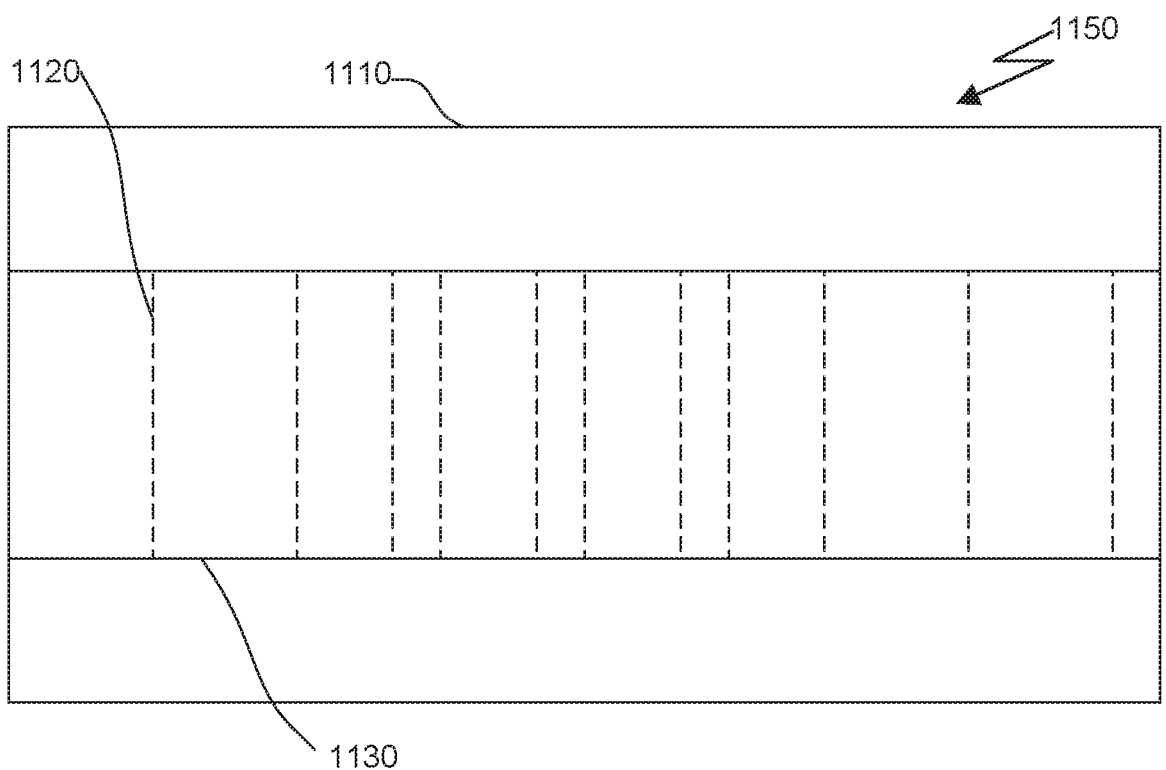

FIGS. 11A and 11B illustrate a process for generating an effective panorama of a scene. The effective panorama 1130 may be generated based on a plurality of images 1120. The plurality of images 1120 may be randomly taken (as in embodiment 1100) or be taken along a preset direction, such as a horizontal direction (as in embodiment 1150). Ideally, a panorama 1110 of the scene may have a latitude span of 180 degrees and a longitude span of 360 degrees. However, when a panorama is generated by combining a plurality of images 1120 (depicted in dashed lines) taken from an imaging device such as a camera, the combined image may not completely cover the entire region of the panorama 1110. Thus, an effective region 1130 may be determined as a rectangular-shaped region in the combined image with a maximum latitude span that does not contain holes or voids. The determined maximum latitude span is deemed as the latitude span corresponding to the panorama 1110. All pixel values of the image 1110 outside the effective region 1130 may be set to a set value, such as zero.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for generating an image of a scene with corresponding depth map, comprising:
    collecting a plurality of copies of a two-dimensional image of the scene;
    generating an intermediate image by concatenating the plurality of copies of the two-dimensional image along a first direction, wherein the intermediate image comprises at least one visual blind zone;
    filling the visual blind zone with a set color;
    removing an upper portion and a bottom portion of the intermediate image;
    generating an intermediate depth map corresponding to the intermediate image by applying a neural network to the intermediate image; and
    generating, from the intermediate image and the intermediate depth map, the image of the scene with the corresponding depth map.

2. The method according to claim 1, further comprising:
    initializing the neural network; and
    training the neural network with a plurality of training images with corresponding training depth maps, comprising:
    generating, for each one of the plurality training images, a predicted depth map and a predicted confidence map based on the training image, calculating a loss function based on the depth information of the training image, the predicted depth map and the predicted confidence map, and updating coefficients of the neural network based on the loss function.

3. The method according to claim 2, wherein at least one training image spans 360 degrees longitudinally, and the method further comprising:

padding at least one of a left boundary or a right boundary of the training image.

4. The method according to claim 1, further comprising:

extracting a plurality of pixels from the image of the scene, each one of the pixels carrying a first set of attributes corresponding to a first height, wherein the first set of attributes comprises a first longitude, a first latitude, a first depth value, and a first color value;

generating, for each one of the pixels, a second set of attributes corresponding to a second height, the second set of attributes comprising a second longitude, a second latitude, a second depth value, and a second color value, wherein the second longitude equals to the first longitude and the second color value equals to the first color value; and generating a second image with a second depth information based on the second set of attributes of the plurality of pixels.

5. The method according to claim 4, further comprising: inserting additional pixels between the plurality of pixels, wherein each one of the inserted pixels includes a color value and a depth information calculated by interpolation.

6. The method according to claim 1, wherein the intermediate image spans in a latitudinal direction less than 180 degrees, the method further comprising:

determining the latitude span of the intermediate image; and generating additional pixels based on the determined latitude span.

7. The method according to claim 1, wherein the plurality of copies of the two-dimensional image include three copies.

8. The method according to claim 1, further comprising removing the upper portion from the intermediate image according to a first set proportion; and removing the bottom portion from the intermediate image according to a second set proportion.

9. A method for generating depth information corresponding to an image of a scene, comprising:

generating a composite image of the scene by concatenating a plurality of copies of at least one initial image of the scene along a first direction, the composite image comprising at least one visual blind zone;

filling the visual blind zone with a set color;

removing an upper portion and a bottom portion of the composite image;

determining an intermediate depth map by applying a neural network to the composite image of the scene; and generating the depth information corresponding to the image of the scene based on the intermediate depth map.

10. The method of claim 9, further comprising:

generating the depth information corresponding to the image of the scene by obtaining a portion of the intermediate depth map corresponding to a copy of the image of the scene.

11. The method of claim 9, further comprising:

generating a plurality of training sets, each training set including a training image and a training depth map; and training the neural network by using the plurality of training sets.

12. The method of claim 11, wherein the plurality of training sets include a first training set and a second training set, and the method further comprises generating the second training set based on the first training set.

13. The method of claim 12, wherein the first training set corresponds to a first height and the second training set corresponding to a second height, and the method further comprises:

selecting, according to a random process, a height value for the second height from a set range; and generating the second training set further based on a mapping between the first height and the second height.

14. The method of claim 13, wherein the image of the scene corresponds to a third height, and the method further comprises:

obtaining a first trained model based on the first training set and a second trained model based on the second training set; and selecting, according to a first height difference between the first height and the third height and a second height difference between the second height and the third height, one of the first trained model and the second trained model for the neural network to determine the intermediate depth map.

15. The method of claim 14, wherein the selected one of the first trained model and the second trained model corresponds to a smaller one of the first height difference and the second height difference.

16. The method of claim 12, wherein:

the first training set corresponds to a first latitude span, the second training set corresponds to a second latitude span, the first latitude span is greater than the second latitude span, and the method further comprises:

obtaining a first trained model based on the first training set and a second trained model based on the second training set;

determining a third latitude span corresponding to the composite image of the scene;

determining the third latitude span is smaller than the first latitude span and equal to or greater than the second latitude span; and selecting the second trained model for the neural network to determine the intermediate depth map.

17. A non-transitory computer-readable medium, having computer-executable instructions stored thereon, the computer-executable instructions, when executed by one or more processor, cause a processor to facilitate:

generating a composite image of a scene by concatenating a plurality of copies of at least one initial image of the scene along a first direction, the composite image comprising at least one visual blind zone;

filling the visual blind zone with a set color;

removing an upper portion and a bottom portion of the composite image;

determining an intermediate depth map by applying a neural network to the composite image of the scene; and generating depth information corresponding to the image of the scene based on the intermediate depth map.

18. The non-transitory computer-readable medium according to claim 17, wherein the processor executes the instructions to further facilitate:
generating the composite image by including a copy of the image of the scene in the composite image; and
generating the depth information corresponding to the image of the scene by obtaining a portion of the intermediate depth map corresponding to the copy of the image of the scene.

19. The non-transitory computer-readable medium according to claim 17, wherein the processor executes the instructions to further facilitate:
generating a plurality of training sets, each training set including a training image and a training depth map; and
training the neural network by using the plurality of training sets.

20. The non-transitory computer-readable medium according to claim 19, wherein the plurality of training sets include a first training set and a second training set, and
the processor executes the instructions to further facilitate generating the second training set based on the first training set.

21. The non-transitory computer-readable medium according to claim 20, wherein the first training set corresponds to a first height and the second training set corresponding to a second height, and
the processor executes the instructions to further facilitate:
selecting, according to a random process, a height value for the second height from a set range; and
generating the second training set further based on a mapping between the first height and the second height.

22. The non-transitory computer-readable medium according to claim 21, wherein the image of the scene corresponds to a third height, and the processor executes the instructions to further facilitate:
obtaining a first trained model based on the first training set and a second trained model based on the second training set; and
selecting, according to a first height difference between the first height and the third height and a second height difference between the second height and the third height, one of the first trained model and the second trained model for the neural network to determine the intermediate depth map.

23. The non-transitory computer-readable medium according to claim 22, wherein the selected one of the first trained model and the second trained model corresponds to a smaller one of the first height difference and the second height difference.

24. The non-transitory computer-readable medium according to claim 20, wherein:
the first training set corresponds to a first latitude span,
the second training set corresponds to a second latitude span,
the first latitude span is greater than the second latitude span, and
the processor executes the instructions to further facilitate:
obtaining a first trained model based on the first training set and a second training model based on the second training set;
determining a third latitude span corresponding to the composite image of the scene;
determining the third latitude span is smaller than the first latitude span and equal to or greater than the second latitude span; and
selecting the second trained model for the neural network to determine the intermediate depth map.

* * * * *